(12) United States Patent
Kim

(10) Patent No.: US 6,844,949 B2
(45) Date of Patent: Jan. 18, 2005

(54) METHOD AND APPARATUS FOR STORING AND RETRIEVING DIGITAL PAGE DATA

(75) Inventor: Kun Yul Kim, Seoul (KR)

(73) Assignee: Daewoo Electronics Corporation (KR)

( * ) Notice: Subject to any disclaimer, the term of this patent is extended or adjusted under 35 U.S.C. 154(b) by 0 days.

(21) Appl. No.: 10/460,026

(22) Filed: Jun. 11, 2003

(65) Prior Publication Data

US 2004/0085599 A1 May 6, 2004

(30) Foreign Application Priority Data

Nov. 5, 2002 (KR) .................................. 10-2002-0068119
Nov. 5, 2002 (KR) .................................. 10-2002-0068118

(51) Int. Cl.$^7$ ................................................. G03H 1/04
(52) U.S. Cl. ........................... 359/35; 359/10; 359/11; 359/3; 359/22; 359/1
(58) Field of Search ........................... 359/35, 1, 3, 10, 359/11, 22, 24, 7

(56) References Cited

U.S. PATENT DOCUMENTS

| | | | |
|---|---|---|---|
| 4,040,039 A | 8/1977 | Hanson et al. | |
| 5,777,760 A | * 7/1998 | Hays et al. | 359/7 |
| 5,835,470 A | * 11/1998 | Campbell et al. | 369/103 |
| 5,943,145 A | * 8/1999 | Curtis et al. | 359/22 |
| 6,377,367 B1 | 4/2002 | Suganuma | |
| 6,512,385 B1 | * 1/2003 | Pfaff et al. | 324/753 |
| 6,697,180 B1 | * 2/2004 | Wilson et al. | 359/11 |
| 2003/0189741 A1 | * 10/2003 | Kang | 359/35 |

* cited by examiner

Primary Examiner—Fayez Assaf
(74) Attorney, Agent, or Firm—Anderson Kill & Olick, PC

(57) ABSTRACT

In a storing mode of an apparatus for sequentially storing and retrieving digital page data, a first and second complex reference beams and a modulated and second signal beams converge on a first/second location to generate a sequence of first and second interference patterns to be sequentially stored on a holographic medium. A shift selectivity of the first complex reference beam is larger than that of the second complex reference beam so that the second interference pattern is used as a servo pattern to sequentially determine where the first interference patterns have been stored.

17 Claims, 6 Drawing Sheets

METHOD AND APPARATUS FOR STORING AND RETRIEVING DIGITAL PAGE DATA

FIELD OF THE INVENTION

The present invention relates to a holographic digital data storage system; and, more particularly, to a method and apparatus for storing and retrieving a sequence of digital page data by using two complex reference beams whose selectivities are different from each other.

BACKGROUND OF THE INVENTION

Responding to ever increasing demands for an optical storage system that can store a large amount of data, such as data for a motion picture film, various types of holographic digital data storage systems incorporating therein a holographic medium made of a photo-refractive crystal such as lithium niobate or the like have been recently developed for realizing high density optical storage capabilities.

The holographic digital data storage system allows a modulated signal beam having information therein to coherently interfere with a reference beam to generate an interference pattern therebetween and, then, controls the interference pattern to be stored as index perturbations (holograms) in a specific recording location of the holographic medium such as a photo-refractive crystal, wherein the photo-refractive crystal is a material which may react differently on interference patterns depending on the respective amplitudes and phases thereof.

To realize high-density storage capabilities, many schemes for hologram multiplexing have been suggested, such as angular multiplexing, wavelength multiplexing, shift multiplexing and phase code multiplexing. Recently, a correlation multiplexing has received considerable attention for its sharp spatial shift selectivity, wherein the correlation multiplexing employs a random pattern (RP) referencing scheme, a speckle pattern referencing scheme or a complex referencing scheme in which a quasi-random-phased speckle wave front is used as a reference beam. Large numbers of holograms may therefore be multiplexed in essentially a same volume of the holographic medium through only a micron-size spatial translation of the holographic medium relative to the reference beam.

Referring to FIG. 1, there is shown a block diagram for illustrating a conventional holographic digital data storage system multiplexed by using a correlation multiplexing. The conventional holographic digital data storage system includes a laser 100, a beam splitter 101, a first and a second mirror 102 and 104, a spatial light modulator (SLM) 105, a diffuser 108, a holographic medium 110, a shutter 111, a linear stage 112 and a charge coupled device (CCD) 120.

In a storing mode, a coherent monochromatic beam, e.g., a laser beam emitted from the laser 100, impinges onto the beam splitter 101. The beam splitter 101 splits the laser beam into a reference beam R and a signal beam S. The reference beam R is a portion of the laser beam transmitted through the beam splitter 101 and the signal beam S is a remaining portion of the laser beam reflected from the beam splitter 101. After being reflected by the first mirror 102, the reference beam enters into the diffuser 108. The diffuser 108 transforms the reference beam into a complex reference beam RD for a correlation multiplexing.

In the meantime, the signal beam S is reflected by the second mirror 104 and, then, enters into the SLM 105. Since a sequence of digital page data is sequentially provided to the SLM 105, the signal beam S is sequentially modulated with the digital page data to generate a modulated signal beam $S_M$.

The modulated signal beam $S_M$ and the complex reference beam $R_D$ are converged on the holographic medium 110 to generate a sequence of interference patterns to be sequentially stored in the holographic medium 110.

To read out the stored data, a retrieving reference beam with characteristics matching with those of the reference beam used during the storing mode must be illuminated precisely to a specific storing location of the holographic medium and diffracts off the stored index perturbations to reconstruct a reconstructed signal beam corresponding to the modulated signal beam.

Specifically, in a retrieving mode, the shutter 111 located along a path of the signal beam turns to be closed so that only a retrieving reference beam R may be obtained from the coherent monochromatic beam, wherein the retrieving reference beam R of the retrieving mode is substantially same as the reference beam R of the storing mode.

After being reflected by the first mirror 102, the retrieving reference beam enters into the diffuser 108. The diffuser 108 transforms the retrieving reference beam into a complex retrieving reference beam $R_D$. Therefore, the complex retrieving reference beam is substantially same as the complex reference beam in the storing mode.

The complex retrieving reference beams $R_D$ is illuminated on the holographic medium 110 in which the interference patterns have been sequentially stored, to sequentially reconstruct a reconstructed signal beam. The reconstructed signal beam is substantially a diffracted beam which is generated from the interference patterns through irradiation of the complex retrieving reference beams $R_D$ into the holographic medium 110. The reconstructed signal beam is captured with a predetermined interval to sequentially recover the digital page data.

Usually, a high-precise linear stage on which the holographic medium is installed has been precisely controlled with the predetermined interval by a DC servo motor, to determine the specific storing location. In other words, after the storing location is detected by using the DC servo motor, the CCD camera may have captured the reconstructed signal beam to read out the digital page data. Since, therefore, the DC servo motor is controlled to sequentially move the high-precise linear stage by a predetermined interval/distance, the storing locations of the digital page data are not precisely detected.

SUMMARY OF THE INVENTION

It is, therefore, a primary object of the present invention to provide a method and apparatus for storing and retrieving a sequence of digital page data by using two complex reference beams so that stored locations may be optically detected by using one of two complex reference beams.

In accordance with a preferred embodiment of the invention, there is provided a method for storing digital page data into a holographic medium which moves continuously and linearly, the method comprising the steps of:

splitting a first and second coherent monochromatic beams into a first/second reference beam and a first/second signal beam;

sequentially modulating the first signal beam with the digital page data to generate a modulated signal beam;

transforming the first/second reference beam into a first/second complex reference beam; and converging the modulated and second signal beam and the first and second complex reference beam on the holographic medium to generate a sequence of first and second interference patterns to be sequentially stored in the holographic medium, wherein a shift selectivity of the first complex reference beam is larger than that of the second complex reference beam so that the second interference patterns are used as servo patterns to sequentially determine where the first interference patterns have been stored, and wherein the shift selectivity of the first and second complex reference beams is a minimum movement of the holographic medium relative to the first and second complex reference beams which causes little correlation between every two neighboring first and second interference patterns.

In accordance with another preferred embodiment of the invention, there is provided a method for retrieving the digital page data from the first interference patterns of claim 1, the method comprising the steps of:

obtaining a first and a second retrieving reference beam from the first and the second coherent monochromatic beam, respectively, wherein the first and the second retrieving reference beam are substantially same as the first and the second reference beam, respectively;

modifying the first and the second retrieving reference beam into a first and a second complex retrieving reference beam, respectively, wherein the first and the second complex retrieving reference beam are substantially same as the first and the second complex reference beam, respectively;

illuminating the first and the second complex retrieving reference beam on the holographic medium in which the first and the second interference patterns have been stored, to sequentially reconstruct a first and a second reconstructed signal beam from the first and the second interference patterns, respectively, wherein the first and the second reconstructed signal beam correspond to the first and second interference patterns, respectively, and the shift selectivity of the first and second reconstructed signal beams is substantially equal to that of the first and second complex reference signal beam so that the shift selectivity of the first reconstructed signal beam is larger than that of the second reconstructed signal beam; and sequentially capturing the first reconstructed signal beam based on the second reconstructed signal beam to sequentially recover the digital page data therefrom.

In accordance with another aspect of the invention, there is provided an apparatus for storing and retrieving digital page data, the apparatus comprising:

a holographic medium, which moves continuously and linearly, for storing the digital page data therein and retrieving the digital page data therefrom;

means for splitting a first and second coherent monochromatic beam into a first/second reference beam and a first/second signal beam;

means for, in a storing mode, sequentially modulating the first signal beam with the digital page data to generate a modulated signal beam;

means for, in a retrieving mode, preventing the first and the second signal beam from being propagated so that only the first and the second reference beam are transmitted as a first and a second retrieving reference beam, respectively, wherein the first and second retrieving reference beams is substantially same as the first/second reference beam;

means for, in the storing mode, transforming the first/second reference beam into a first and second complex reference beams and, in the retrieving mode, transforming the first and second retrieving reference beam into a first/second complex retrieving reference beam, wherein the first/second complex retrieving reference beam is substantially same as the first and second complex reference beams;

means for, in the storing mode, converging the modulated and second signal beam and the first and second complex reference beams on the holographic medium to generate a sequence of first and second interference patterns to be sequentially stored on the holographic medium, wherein a shift selectivity of the first complex reference beam is larger than that of the second complex reference beam so that the second interference pattern is used as a servo pattern to sequentially determine where the first interference patterns has been stored, and wherein the shift selectivity of the first and second complex reference beams is defined by a minimum movement of the holographic medium relative to the first and second complex reference beams which causes little correlation between every two neighboring first/second interference patterns;

means for, in the retrieving mode, illuminating the first/second complex retrieving reference beam on the holographic medium in which the first and second interferences patterns have been stored, to sequentially reconstruct a first and second reconstructed signal beam from the first and second interference patterns, wherein the first and second reconstructed signal beams corresponds to the modified/second signal beam; and means for sequentially capturing the first reconstructed signal based on the second reconstructed signal to sequentially recover the digital page data therefrom, wherein the first and second reconstructed signal beams corresponds to the first and second interference patterns and the shift selectivity of the first and second reconstructed signal beams is substantially equal to that of the first/second complex reference signal so that the shift selectivity of the first reconstructed signal beam is larger than that of the second reconstructed signal beam.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
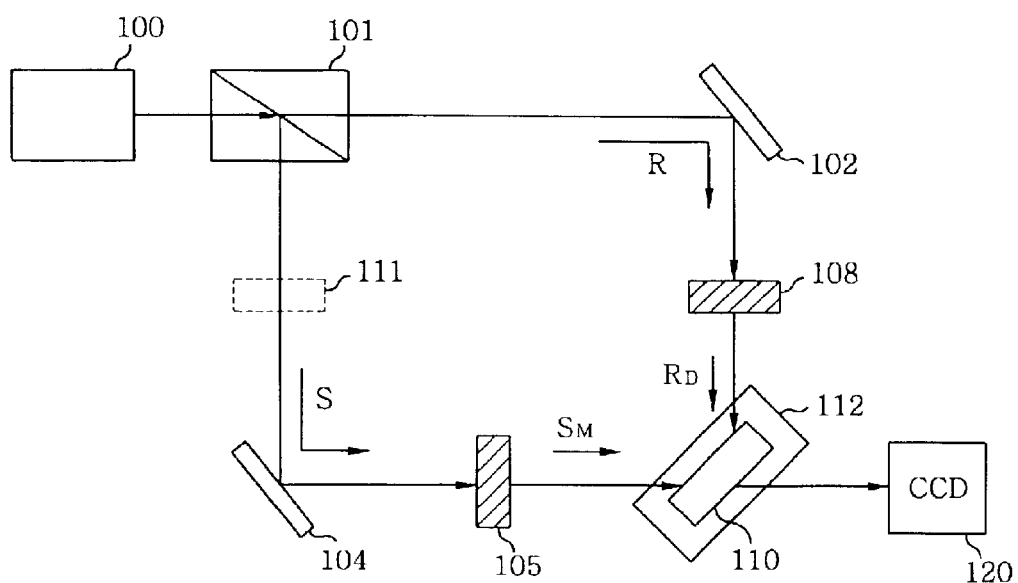
FIG. 1 represents a block diagram for illustrating a conventional holographic digital data storage system multiplexed by using a correlation multiplexing.
Figure 2A:
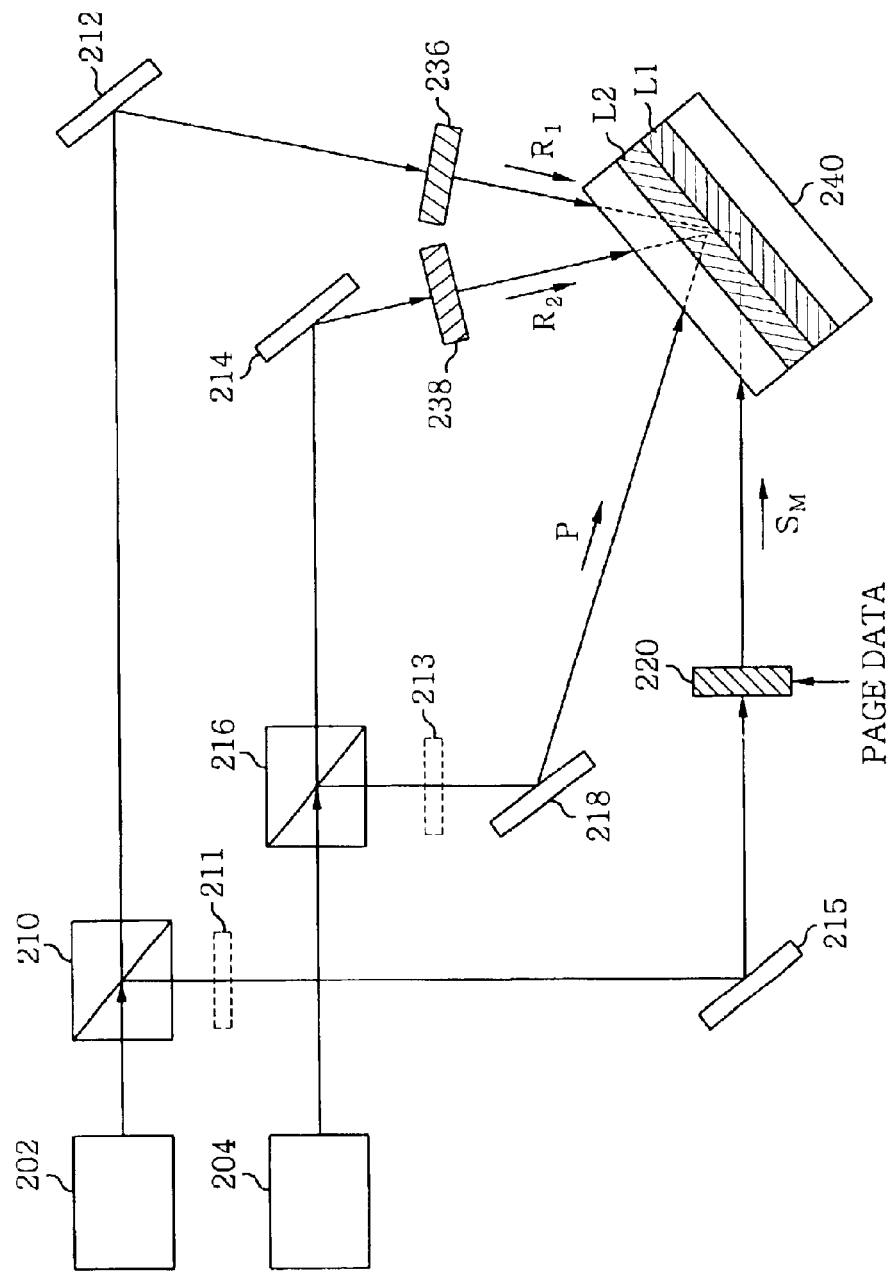
FIG. 2A shows a block diagram for illustrating a storing mode of a holographic digital data storage system in accordance with the present invention.
Figure 2B:
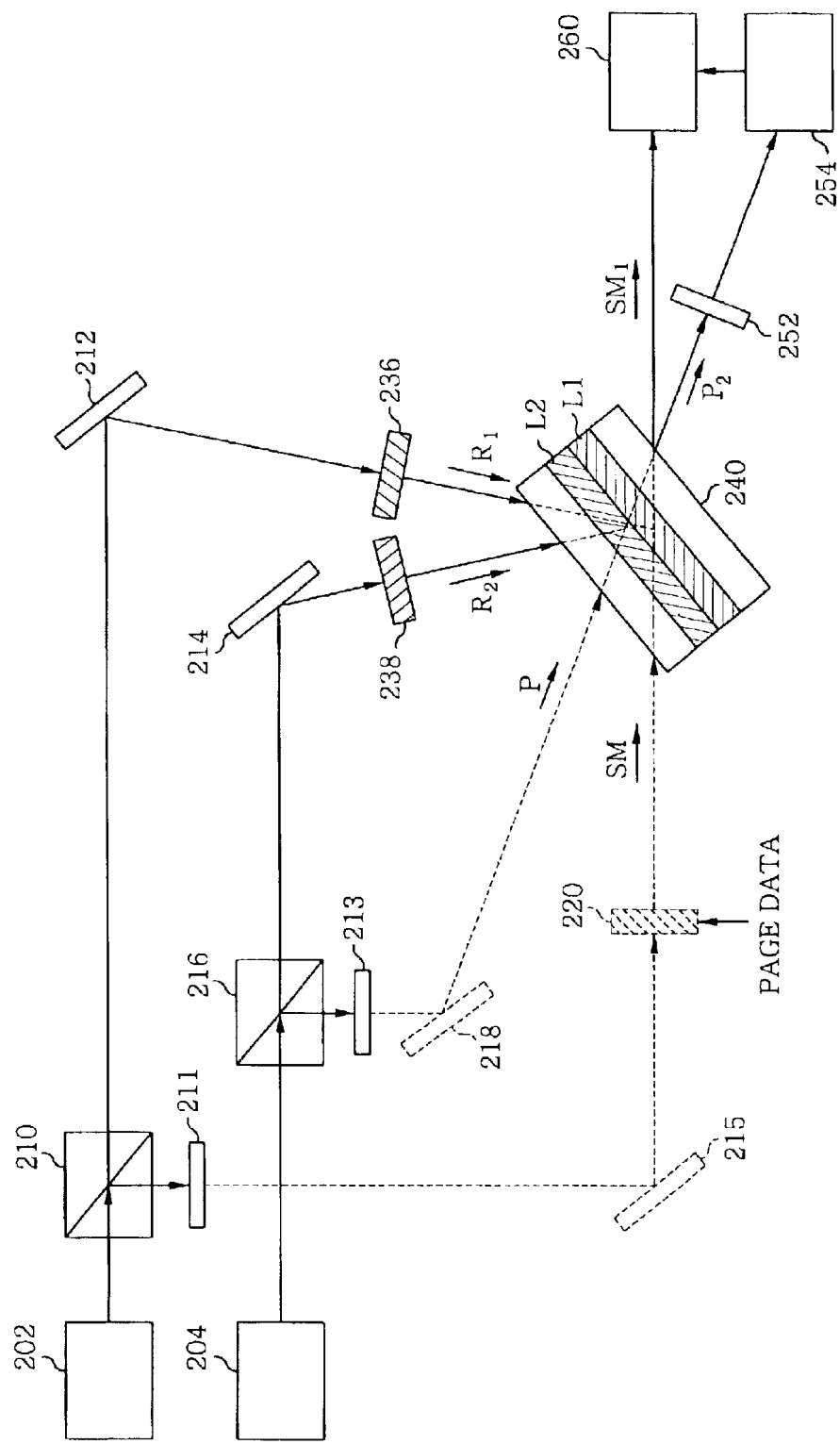
FIG. 2B describes a block diagram for illustrating a retrieving mode of the holographic digital data storage system shown in FIG. 2A in accordance with the present invention.

Referring to FIGS. 2A and 2B, there is shown a block diagram for illustrating a holographic digital data storage system in accordance with a preferred embodiment of the present invention. FIG. 2A illustrates a storing mode of the holographic digital data storage system while FIG. 2B illustrates a retrieving mode thereof. The holographic digital data storage system includes a first and a second laser 202 and 204, a first and a second beam splitter 210 and 216, a first and a second shutter 211 and 213, a first, a second, a third and a fourth mirror 212, 214, 215 and 218, a spatial light modulator (SLM) 220, a first and a second diffuser 236 and 238, a holographic medium 240, a photodetector 252, a pulse generator 254 and a charge coupled device (CCD) 260. For illustration, it is assumed that the holographic medium 240 having a type of a disk is rotated at a rotational speed such that a storing location of the holographic medium 240 may move continuously and linearly. Since two lasers 202 and 204 generate two different coherent monochromatic beams, it is preferable that the holographic medium 240 has two layers L1 and L2, wherein one layer is susceptible to a first coherent monochromatic beam while the other layer is susceptible to a second coherent monochromatic beam.

In the storing mode shown in FIG. 2A, the first coherent monochromatic beam, e.g., a laser beam emitted from the first laser 202, impinges onto the first beam splitter 210 while the second coherent monochromatic beam, e.g., another laser beam emitted from the second laser 204, impinges onto the second beam splitter 216. A wavelength of the first coherent monochromatic beam is generally different from that of the second coherent monochromatic beam.

The first beam splitter 210 splits the first laser beam into a first reference beam and a first signal beam, wherein the first reference beam is a portion of the first laser beam transmitted through the first beam splitter 210 and the first signal beam is a remaining portion of the first laser beam reflected from the first beam splitter 210. In the meantime, the second beam splitter 216 splits the second laser beam into a second reference beam and a second signal beam P, wherein the second reference beam is a portion of the second laser beam transmitted through the second beam splitter 216 and the second signal beam P is a remaining portion of the second laser beam reflected from the second beam splitter 216.

After being reflected by the first and the second mirror 212 and 214, the first and the second reference beam enter into the first and the second diffuser 236 and 238, respectively. The first diffuser 236 transforms the first reference beam into a first complex reference beam $R_1$ for a wider correlation multiplexing while the second diffuser 238 transforms the second reference beam into a second complex reference beam $R_2$ for a narrower correlation multiplexing. In other words, a shift selectivity of the first diffuser 236 is larger than that of the second diffuser 238 so that the shift selectivity of the first complex reference beam $R_1$ is larger than that of the second complex reference beam $R_2$. It is preferable that the shift selectivity of the first complex reference beam $R_1$ is approximately 2 to 50 times larger than that of the second complex reference beam $R_2$.

Figure 4:
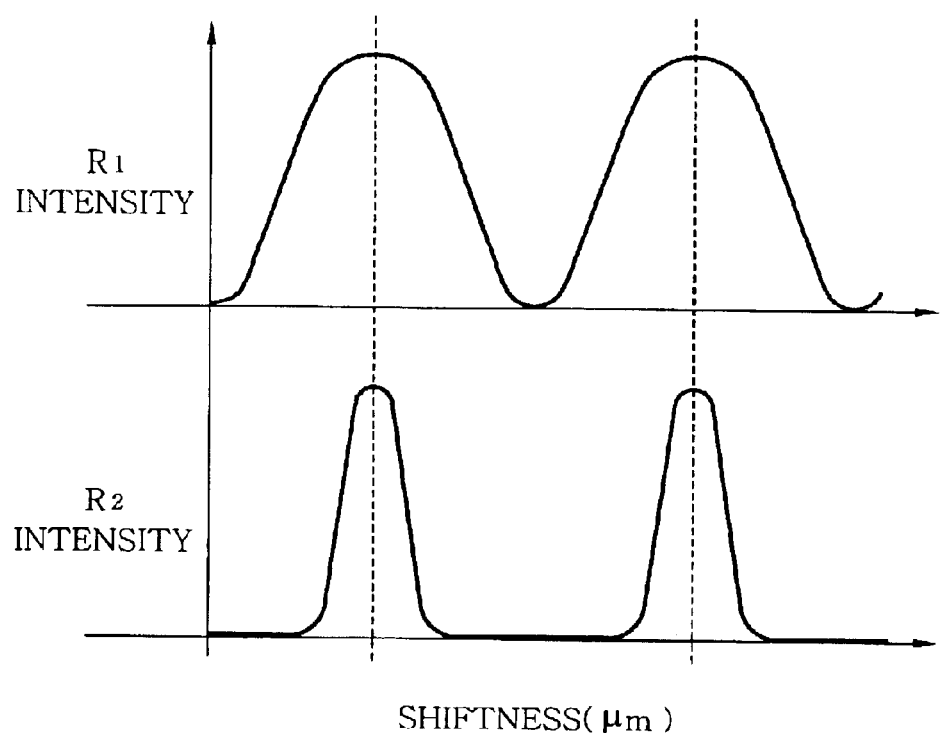
FIG. 4 provides a graph for illustrating a shift selectivity of a first complex reference beam which is larger than that of a second complex reference beam in accordance with the present invention.

Referring to FIG. 4, there is shown a graph for illustrating the shift selectivity of the first complex reference beam $R_1$ which is larger than that of the second complex reference beam $R_2$ in accordance with the present invention. The shift selectivity of the first and second complex reference beams represents a minimum movement of the holographic medium 240 relative to the first and second complex reference beams which causes little correlation between every two neighboring first and second interference patterns as will be described, wherein the first and the second interference patterns correspond to the first and the second complex reference beam, respectively. Therefore, the smaller is the shift selectivity, the more holograms, i.e., holographic interference patterns, may be stored.

Referring back to FIG. 2A, the first and the second complex reference beam $R_1$ and $R_2$ are introduced into the holographic medium 240.

In the meantime, the first signal beam is reflected by the third mirror 215 and, then, enters into the SLM 220. Since a sequence of digital page data is sequentially provided to the SLM 220, the first signal beam is sequentially modulated with the digital page data to generate a modulated signal beam $S_M$. The modulated signal beam $S_M$ has been modulated with a modulation period, that depends on the larger shift selectivity, i.e., the shift selectivity of the first complex reference beam $R_1$, as will be described later. Since the holographic medium 240 with a type of a disk is usually rotated at a predetermined speed v such that the shift selectivity of the first and second complex reference beams $R_1$ and $R_2$ may be related with the modulation period of the modulated signal beam $S_M$. Specifically, the modulation period of the modulated signal beam $S_M$ is equal to or larger than an interval that is given by the larger shift selectivity, i.e., the shift selectivity of the first complex reference beam $R_1$, divided by the predetermined speed v of the holographic medium 240.

Further, the second signal beam P is reflected by the fourth mirror 218 and then enters into the holographic medium 240.

The first complex reference beam $R_1$ and the modulated signal beam $S_M$ converge on a first location in a first layer L1 of the holographic medium 240 to generate a sequence of first interference patterns to be sequentially stored in the first layer L1 while the second complex reference beam $R_2$ and the second signal beam P converge on a second location in a second layer L2 of the holographic medium 240 to generate a sequence of second interference patterns to be sequentially stored in the second layer L2. Since two coherent monochromatic beams are different from each other, it is preferable that the holographic medium 240 has two different layers, which are susceptible to different wavelengths, respectively. In other words, one layer, i.e., the first layer L1, of the holographic medium 240 is susceptible to the first coherent monochromatic beam while the other layer, i.e., the second layer L2, of the holographic medium 240 is susceptible to the second coherent monochromatic beam. The second interference patterns generated by the second complex reference beam $R_2$, the shift selectivity of which is smaller than that of the first reference beam $R_1$, will be used as servo patterns to sequentially determine where the first interference patterns have been stored.

It is natural that there is no correlation between the first and the second complex reference beam $R_1$ and $R_2$ because the wavelengths of the first and the second complex reference beam $R_1$ and $R_2$ are different from each other.

In the retrieving mode shown in FIG. 2B, two shutters 211 and 213 located along two paths of the first and the second signal beam turn to be closed, respectively, so that only a first and a second retrieving reference beam may be obtained from the first and the second coherent monochromatic beam, respectively. The first and the second retrieving reference beam in the retrieving mode is substantially same as the first and the second reference beam in the storing mode, respectively.

After being reflected by the first and the second mirror 212 and 214, the first and the second retrieving reference beam enter into the first and the second diffuser 236 and 238, respectively. The first diffuser 236 transforms the first retrieving reference beam into a first complex retrieving reference beam $R_1$ while the second diffuser 238 transforms the second retrieving reference beam into a second complex retrieving reference beam $R_2$. Therefore, the first/second complex retrieving reference beam in the retrieving mode is substantially same as the first and second complex reference beams in the storing mode. Since the shift selectivity of the first diffuser 236 is larger than that of the second diffuser 238, the shift selectivity of the first complex retrieving reference beam $R_1$ is larger than that of the second complex retrieving reference beam $R_2$.

The first and second complex retrieving reference beams $R_1/R_2$ is illuminated on the first/second location in the first/second layer L1/L2 of the holographic medium 240 in which the first and second interference patterns have been sequentially stored, to sequentially reconstruct a first and second reconstructed signal beams $S_{M1}/P_2$. Each reconstructed signal beam $S_{M1}/P_2$ is substantially a diffracted beam which is generated from the first and second interference patterns through irradiation of the first/second complex retrieving reference beam $R_1/R_2$ into the first/second layer L1/L2 of the holographic medium 240.

Then, the first reconstructed signal beam $S_{M1}$ is captured based on the second reconstructed signal beam $P_2$ such that the digital page data are sequentially recovered from the first reconstructed signal beam $S_{M1}$, wherein the shift selectivity of the first reconstructed signal beam $S_{M1}$ is larger than that of the second reconstructed signal beam $P_2$. In other words, since the second reconstructed signal beam $P_2$ is more sensitive than the first reconstructed signal beam $S_{M1}$, the second reconstructed signal beam $P_2$ may used as a servo signal for capturing the first reconstructed signal beam $S_{M1}$. Specifically, the photodetector 252 continuously detects the second reconstructed signal beam $P_2$. The pulse generator 254 determines whether or not an intensity of the second reconstructed signal beam $P_2$ is larger than a predetermined threshold. If the intensity of the second reconstructed signal beam $P_2$ is larger than the predetermined threshold, the pulse generator 254 generates a trigger signal to control the CCD 260. It is preferable that the trigger signal is a pulse which is activated in accordance with the modulation period of the modulated signal beam $S_M$. Whenever the trigger signal is activated, the CCD 260 sequentially captures the first reconstructed signal beam $S_{M1}$ to sequentially recover the digital page data therefrom.

Figure 3A:
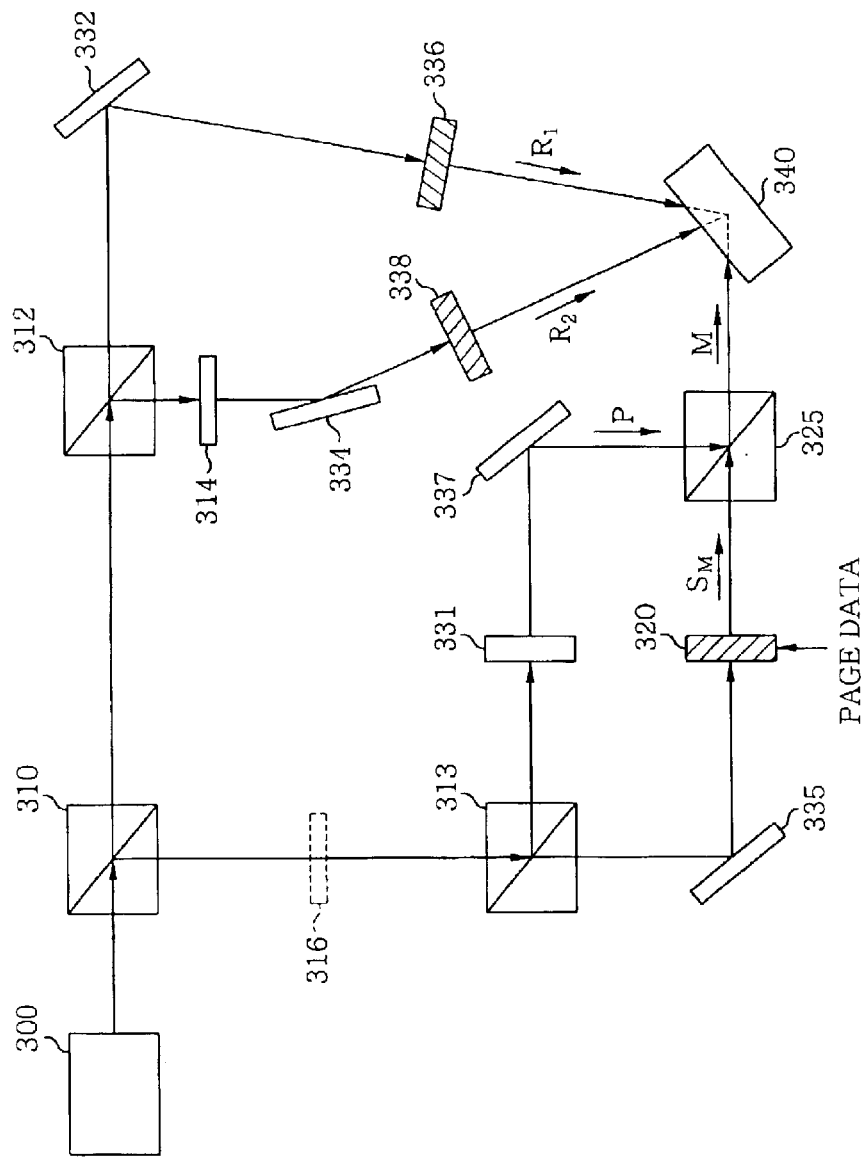
FIG. 3A shows a block diagram for illustrating a storing mode of another holographic digital data storage system in accordance with the present invention.
Figure 3B:
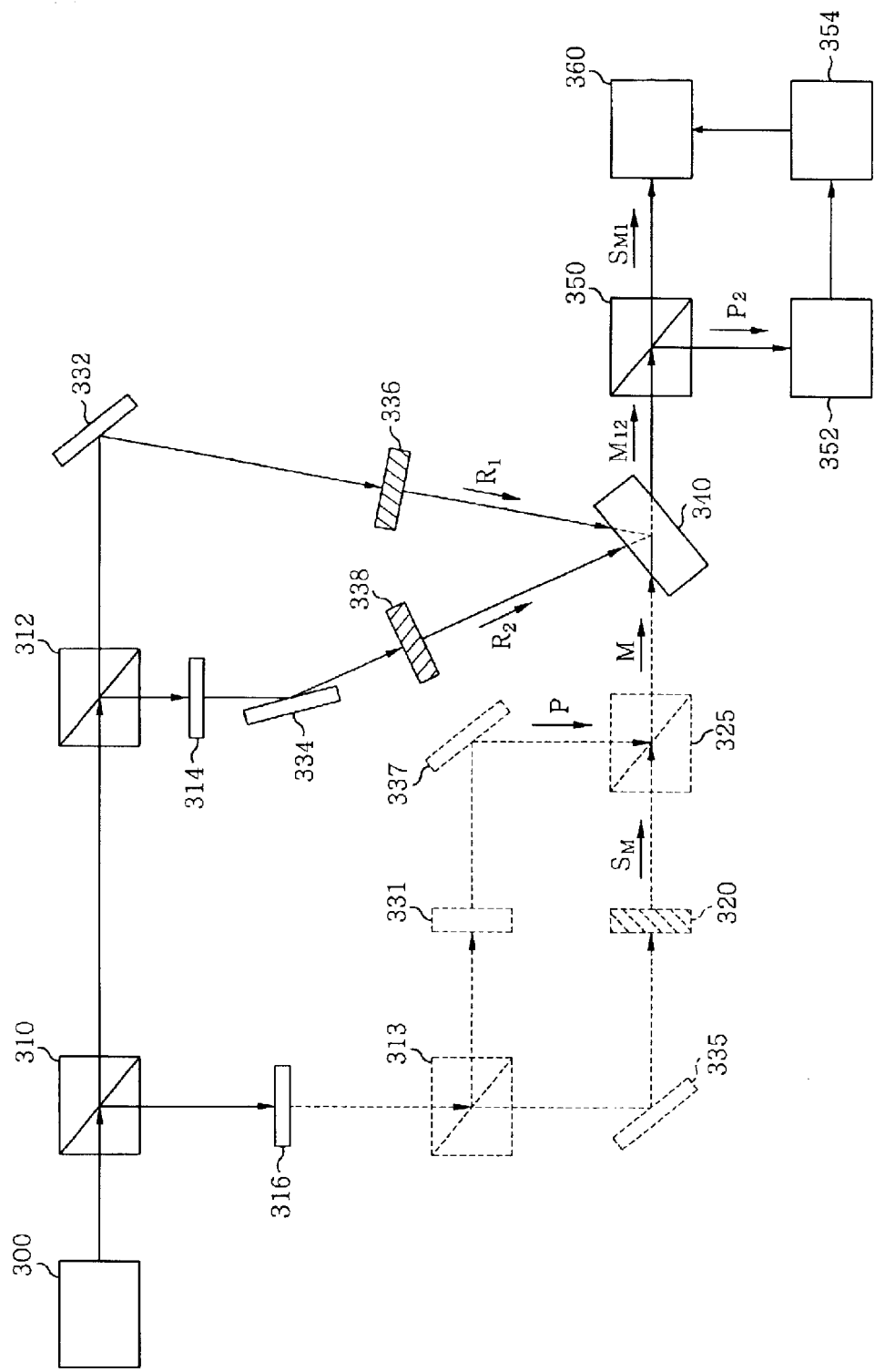
FIG. 3B describes a block diagram for illustrating a retrieving mode of the holographic digital data storage system shown in FIG. 3A in accordance with the present invention.

Referring to FIGS. 3A and 3B, there is shown another block diagram for illustrating another holographic digital data storage system in accordance with another preferred embodiment of the present invention. FIG. 3A illustrates a storing mode of the holographic digital data storage system while FIG. 3B illustrates a retrieving mode thereof. The holographic digital data storage system includes a laser 300, a first, a second, a third, a fourth and a fifth beam splitter 310, 312, 313, 325 and 350, a reference and a signal polarizer 314 and 331, a shutter 316, a first, a second, a third and a fourth mirror 332, 334, 335 and 337, a spatial light modulator (SLM) 320, a first and a second diffuser 336 and 338, a holographic medium 340, a photodetector 352, a pulse generator 354 and a charge coupled device (CCD) 360. The holographic medium 340 is substantially same as the holographic medium 240 shown in FIGS. 2A and 2B, except that the holographic medium 340 has only one layer (not shown), which is susceptible to a specific coherent monochromatic beam.

In the storing mode shown in FIG. 3A, a coherent monochromatic beam, e.g., a laser beam emitted from the laser 300, impinges onto the first beam splitter 310. The first beam splitter 310 splits the laser beam into a reference beam and a signal beam, wherein the reference beam is a portion of the laser beam transmitted through the first beam splitter 310 and the signal beam is a remaining portion of the laser beam reflected from the first beam splitter 310. The second beam splitter 312 splits the reference beam into a first and a second reference beam, wherein the first reference beam is a portion of the reference beam transmitted through the second beam splitter 312 and the second reference beam is a remaining portion of the reference beam reflected from the second beam splitter 312. In the mean time, the third beam splitter 313 splits the signal beam into a first and a second signal beam, wherein the first signal beam is a portion of the signal beam transmitted through the third beam splitter 313 and the second signal beam is a remaining portion of the signal beam reflected from the third beam splitter 313.

It is preferable that the second reference beam and the second signal beam enter into the reference and the signal polarizer 314 and 331, respectively. For example, if the reference and the signal polarizer 314 and 331 are vertical polarizers, they polarize the second reference beam and the second signal beam vertically with respect to the first reference beam and the first signal beam, respectively.

After being reflected by the first and the second mirror 332 and 334, the first and the second reference beam enter into the first and the second diffuser 336 and 338, respectively. Since the first and the second diffuser 336 and 338 are substantially same as the first and the second diffuser 236 and 238 shown in FIGS. 2A and 2B, respectively, a first complex reference beam $R_1$ for a wider correlation multiplexing and a second complex reference beam $R_2$ for a narrower correlation multiplexing are introduced into the holographic medium 340 as described above.

In the meantime, the first signal beam is reflected by the third mirror 335 and, then, enters into the SLM 320. Since a sequence of digital page data is sequentially provided to the SLM 320, the first signal beam is sequentially modulated with the digital page data to generate a modulated signal beam $S_M$. The modulated signal beam $S_M$ is modulated with a modulation period that depends on the larger shift selectivity, i.e., the shift selectivity of the first complex reference beam $R_1$.

The vertically-polarized second signal beam P is reflected by the fourth mirror 337 and then enters into the fourth beam splitter 325. The second signal beam P is reflected from the fourth beam splitter 325 while the modulated signal beam $S_M$ is transmitted through the fourth beam splitter 325. In other words, the modulated signal beam $S_M$ and the second signal beam P are merged as a merged signal beam by using the fourth beam splitter 325. The merged signal beam enters into the holographic medium 340.

The first and the second complex reference beam $R_1$ and $R_2$ and the merged signal beam converge on a location in the holographic medium 340 to thereby generate a sequence of interference patterns to be sequentially stored in the holographic medium 340.

Since the first complex reference beam $R_1$ and the second complex reference beam $R_2$ are vertically polarized with respect to each other, it is natural that there is no correlation between the first complex reference beam $R_1$ and the second complex reference beam $R_2$. In other words, the first complex reference beam $R_1$ is correlated with only the modulated signal beam $S_M$ in the merged signal beam to generate a sequence of first interference patterns while the second complex reference beam $R_2$ is correlated with only the second signal beam P in the merged signal beam to generate a sequence of second interference patterns. Accordingly, the interference patterns are made of the first and the second interference patterns.

Further, since a wavelength of the first complex reference beam $R_1$ is equal to that of the second complex reference beam $R_2$, the holographic medium 340 has one layer, which is susceptible to the wavelength.

Since the second interference patterns generated by the second complex reference beam $R_2$ has a shift selectivity smaller than that of the first reference beam $R_1$, they will be used as servo patterns to sequentially determine where the first interference patterns have been stored.

In the retrieving mode shown in FIG. 3B, the shutter 316 located along the path of the signal beam turns to be closed so that only a retrieving reference beam may be obtained from the coherent monochromatic beam. The retrieving reference beam in the retrieving mode is substantially same as the reference beam in the storing mode.

The second beam splitter 312 splits the retrieving reference beam into a first and a second retrieving reference beam, wherein the first and the second retrieving reference beam in the retrieving mode are substantially same as the first and the second reference beam in the storing mode, respectively. Since the second retrieving reference beam is transmitted through the reference polarizer 314, i.e., a vertical polarizer, it is vertically polarized with respect to the first retrieving reference beam.

After being reflected by the first and the second mirror 332 and 334, the first and the second reference beam enter into the first and the second diffuser 336 and 338, respectively, to generate a first and a second complex retrieving reference beam $R_1$ and $R_2$, respectively.

Both the first and the second complex retrieving reference beam $R_1$ and $R_2$ are illuminated on the holographic medium 340, in which the interference patterns, i.e., the first and the second interference patterns, have been sequentially stored, to sequentially reconstruct a reconstructed signal beam. The reconstructed signal beam is substantially a diffracted beam which is generated from the interference patterns through the irradiation of the first and the second complex retrieving reference beam $R_1$ and $R_2$ into the holographic medium 340. By using the fourth beam splitter 350, the reconstructed signal beam is split into a first and a second reconstructed signal beam $S_{M1}$ and $P_2$. Since the second reconstructed signal beam $P_2$ is vertically polarized, the first reconstructed signal beam $S_{M1}$ is transmitted through the fourth beam splitter 350 while the second reconstructed signal beam $P_2$ is reflected from the fourth beam splitter 350.

Then, the first reconstructed signal beam $S_{M1}$ is captured based on the second reconstructed signal beam $P_2$ so that the digital page data are sequentially recovered from the first reconstructed signal beam $S_{M1}$, wherein the shift selectivity of the first reconstructed signal beam $S_{M1}$ is larger than that of the second reconstructed signal beam $P_2$. Specifically, the photodetector 352 continuously detects the second reconstructed signal beam $P_2$. The pulse generator 354 determines whether or not an intensity of the second reconstructed signal beam $P_2$ is larger than a predetermined threshold. If the intensity of the second reconstructed signal beam $P_2$ is larger than the predetermined threshold, the pulse generator 354 generates a trigger signal to control the CCD 360. It is preferable that the trigger signal is a pulse which is activated in accordance with the modulation period of the modulated signal beam $S_M$. Whenever the trigger signal is activated, the CCD 360 sequentially captures the first reconstructed signal beam $S_{M1}$ to sequentially recover the digital page data therefrom.

While the invention has been shown and described with respect to the preferred embodiments, it will be understood by those skilled in the art that various changes and modifications may be made without departing from the spirit and scope of the invention as defined in the following claims.

What is claimed is:

1. A method for storing digital page data into a holographic medium which moves continuously and linearly, the method comprising the steps of:

splitting a first and a second coherent monochromatic beam into a first and a second reference beam and a first and a second signal beam;

sequentially modulating the first signal beam with the digital page data to generate a modulated signal beam;

transforming the first and the second reference beam into a first and a second complex reference beam, respectively; and converging the modulated and the second signal beam and the first and the second complex reference beam on the holographic medium to generate a sequence of first and second interference patterns to be sequentially stored in the holographic medium, wherein a shift selectivity of the first complex reference beam is larger than that of the second complex reference beam so that the second interference patterns are used as servo patterns to sequentially determine where the first interference patterns have been stored, and wherein the shift selectivities of the first and the second complex reference beams are minimum movements of the holographic medium relative to the first and the second complex reference beams which cause little correlations between every two neighboring first and second interference patterns, respectively.

2. The method of claim 1, wherein a wavelength of the first coherent monochromatic beam is different from that of the second coherent monochromatic beam and the holographic medium has two layers which are susceptible to the first and the second coherent monochromatic beams, respectively.

3. The method of claim 1, wherein a wavelength of the first coherent monochromatic beam is equal to that of the second coherent monochromatic beam while the first and the second coherent monochromatic beam are vertically polarized with respect to each other.

4. The method of claim 3, wherein the modulated signal beam and the second signal beam are merged as a merged signal beam, and the merged signal beam and the first and the second complex reference beam converge on a location on which the holographic medium is located.

5. The method of claim 1, wherein the shift selectivity of the first complex reference beam is approximately 2 to 50 times larger than that of the second complex reference beam.

6. A method for retrieving the digital page data from the first interference patterns of claim 1, the method comprising the steps of:

obtaining a first and a second retrieving reference beam from the first and the second coherent monochromatic beam, respectively, wherein the first and the second retrieving reference beam are substantially same as the first and the second reference beam, respectively;

modifying the first and the second retrieving reference beam into a first and a second complex retrieving reference beam, respectively, wherein the first and the second complex retrieving reference beam are substantially same as the first and the second complex reference beam, respectively;

illuminating the first and the second complex retrieving reference beam on the holographic medium in which the first and the second interference patterns have been stored, to sequentially reconstruct a first and a second reconstructed signal beam from the first and the second interference patterns, respectively, wherein the first and the second reconstructed signal beam correspond to the first and second interference patterns, respectively, and the shift selectivities of the first and the second reconstructed signal beams are substantially equal to those of the first and the second complex reference signal beam, resepectively, so that the shift selectivity of the first reconstructed signal beam is larger than that of the second reconstructed signal beam; and sequentially capturing the first reconstructed signal beam based on the second reconstructed signal beam to sequentially recover the digital page data therefrom.

7. The method of claim 6, wherein the first and the second complex retrieving reference beam are vertically polarized with respect to each other.

8. The method of claim 6, wherein said capturing step includes the steps of:

generating a trigger signal from the second reconstructed signal beam; and sequentially capturing the first reconstructed signal beam based on the trigger signal to sequentially recover the digital page data therefrom.

9. The method of claim 8, wherein said generating step has the steps of:

determining whether or not an intensity of the second reconstructed signal beam is larger than a predetermined threshold; and creating, if the intensity of the second reconstructed signal beam is larger than the predetermined threshold, the trigger signal.

10. The method of claim 6, wherein the shift selectivity of the first complex retrieving reference beam is approximately 2 to 50 times larger than that of the second complex retrieving reference beam.

11. An apparatus for storing and retrieving digital page data, the apparatus comprising:

a holographic medium, which moves continuously and linearly, for storing the digital page data therein and retrieving the digital page data therefrom;

means for splitting a first and a second coherent monochromatic beam into a first and a second reference beam and a first and a second signal beam;

means for, in a storing mode, sequentially modulating the first signal beam with the digital page data to generate a modulated signal beam;

means for, in a retrieving mode, preventing the first and the second signal beam from being propagated so that only the first and the second reference beams are transmitted as a first and a second retrieving reference beam, respectively, wherein the first and the second retrieving reference beams are substantially the same as the first and the second reference beam, respectively;

means for, in the storing mode, transforming the first and the second reference beams into a first and a second complex reference beam, respectively, and, in the retrieving mode, transforming the first and the second retrieving reference beams into a first and a second complex retrieving reference beam, respectively, wherein the first and the second complex retrieving reference beams are substantially the same as the first and the second complex reference beams, respectively;

means for, in the storing mode, converging the modulated and the second signal beams and the first and the second complex reference beams on the holographic medium to generate a sequence of first and second interference patterns to be sequentially stored on the holographic medium, wherein a shift selectivity of the first complex reference beam is larger than that of the second complex reference beam so that the second interference pattern is used as a servo pattern to sequentially determine where the first interference patterns has been stored, and wherein the shift selectivities of the first and the second complex reference beams are defined by minimum movements of the holographic medium relative to the first and the second complex reference beams which cause little correlations between every two neighboring first and second interference patterns, respectively;

means for, in the retrieving mode, illuminating the first and the second complex retrieving reference beams on the holographic medium in which the first and the second interference patterns have been stored, to sequentially reconstruct a first and a second reconstructed signal beam from the first and the second interference patterns, respectively, wherein the first and the second reconstructed signal beams correspond to the modified and the second signal beams respectively; and means for sequentially capturing the first reconstructed signal based on the second reconstructed signal to sequentially recover the digital page data therefrom, wherein the first and the second reconstructed signal beams correspond to the first and the second interference patterns, respectively, and the shift selectivities of the first and the second reconstructed signal beams are substantially equal to those of the first and the second complex reference signals, respectively, so that the shift selectivity of the first reconstructed signal beam is larger than that of the second reconstructed signal beam.

12. The apparatus of claim 11, wherein a wavelength of the first coherent monochromatic beam is different from that of the second coherent monochromatic beam and the holographic medium has two layers which are susceptible to the first and the second coherent monochromatic beam, respectively.

13. The apparatus of claim 11, further comprising:

means for generating a coherent monochromatic beam; and means for dividing the coherent monochromatic beam into the first and the second coherent monochromatic beam which are vertically polarized with respect to each other.

14. The apparatus of claim 13, wherein, in the storing mode, the modulated signal beam and the second signal beam are merged as a merged signal beam, and the merged signal beam and the first and the second complex reference beam converge on a location on which the holographic medium is located.

15. The apparatus of claim 11, wherein the shift selectivity of the first complex reference beam is approximately 2 to 50 times larger than that of the second complex reference beam and the shift selectivity of the first complex retrieving reference beam is approximately 2 to 50 times larger than that of the second complex retrieving reference beam.

16. The apparatus of claim 11, wherein said capturing means includes:

means for generating a trigger signal from the second reconstructed signal beam; and means for sequentially capturing the first reconstructed signal beam based on the trigger signal to sequentially recover the digital page data therefrom.

17. The apparatus of claim 16, wherein said generating means has:

means for determining whether or not an intensity of the second reconstructed signal beam is larger than a predetermined threshold; and means for creating, if the intensity of the second reconstructed signal beam is larger than the predetermined threshold, the trigger signal.

\* \* \* \* \*